United States Patent [19]

Silva

[11] Patent Number: 5,379,686

[45] Date of Patent: Jan. 10, 1995

[54] ROTISSERIE APPARATUS

[76] Inventor: Fernando Silva, 515 NW. 122 St., N. Miami Beach, Fla. 33168

[21] Appl. No.: 155,890

[22] Filed: Nov. 23, 1993

[51] Int. Cl.⁶ .................................. A47J 37/04
[52] U.S. Cl. ................................. 99/421 H
[58] Field of Search .............. 99/419, 421 R, 421 H, 99/421 HH, 421 V; 126/41 B

[56] References Cited

U.S. PATENT DOCUMENTS

| | | | |
|---|---|---|---|
| 2,130,259 | 9/1938 | Bonaguidi | 126/41 B |
| 3,442,202 | 5/1969 | Taizo | 99/421 R |
| 4,760,776 | 8/1988 | Beidler | 99/421 H |
| 5,172,628 | 12/1992 | Pillsbury | 99/419 |

Primary Examiner—Robert W. Jenkins
Attorney, Agent, or Firm—J. Sanchelima

[57] ABSTRACT

A rotisserie apparatus for rotating and roasting articles of food comprising a support assembly, a skewer assembly, a rotatable assembly and a drive assembly. The drive assembly turning a plurality of rotatable assemblies which are in turn removably mounted to skewer assemblies. The skewer assemblies hold food stuffs, which a user desires to roast, over a heat source. Because each skewer is independently and removably mounted to its own rotatable assembly, the entire device does not have to be stopped to remove a single skewer assembly. The support assembly, in conjunction with the rotatable assembly, cooperatively suspends the skewer assemblies over the heat source contained therein.

1 Claim, 3 Drawing Sheets

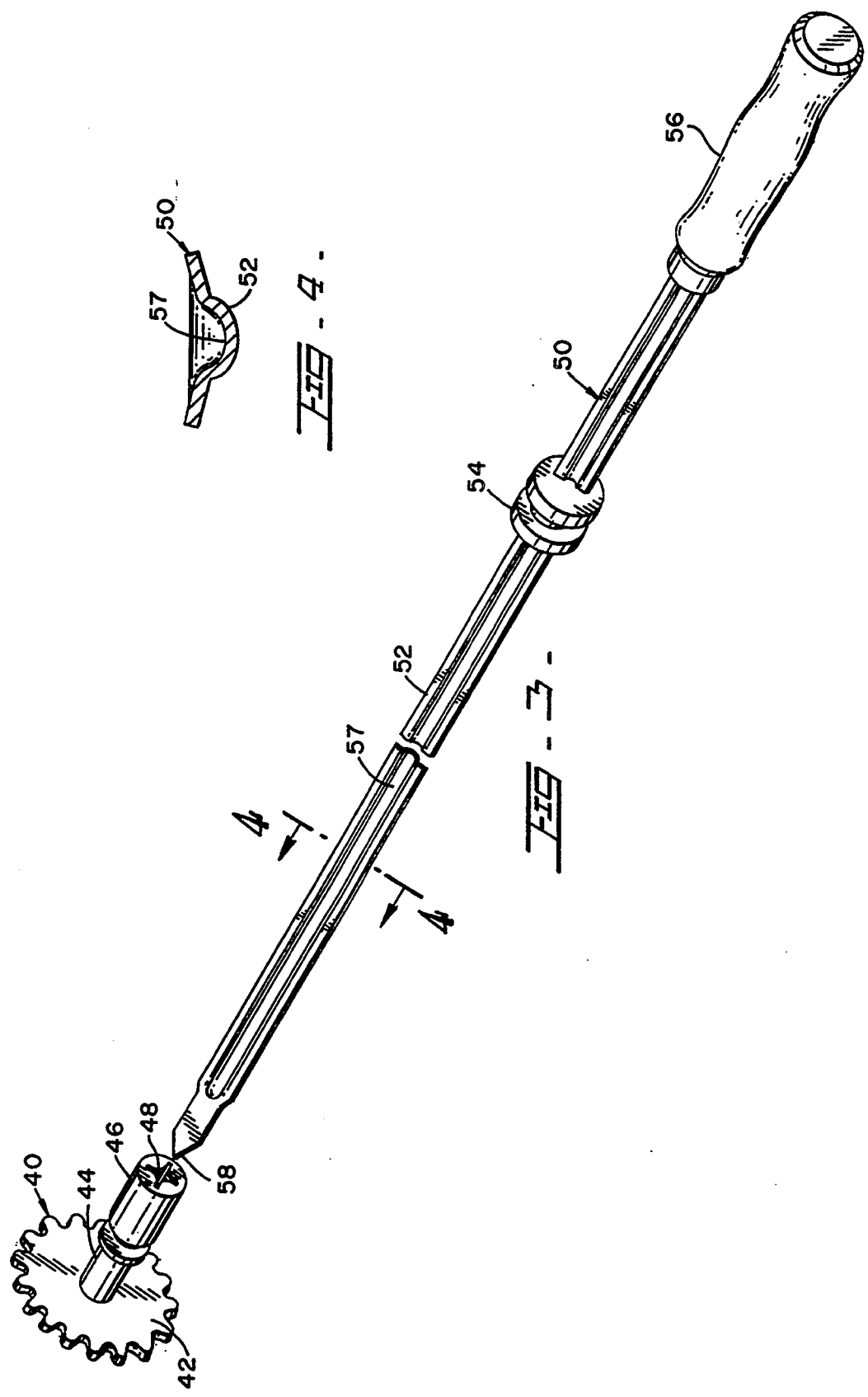

ROTISSERIE APPARATUS

BACKGROUND OF THE INVENTION

1. Field of the Invention

The present invention relates to roasting devices, and more particularly, to those including mechanisms for slowly rotating a food stuff being roasted.

2. Description of the Related Art

Applicant believes that the closest reference corresponds to U.S. Pat. No. 2,130,259 issued to George C. Bonaguidi. However, it differs from the present invention because a user cannot remove a single cooking skewer without interrupting the rotation of the other cooking skewers.

While there have been many designs in the past to accomplish the objective of roasting food by slowly rotating it and exposing it to a heat source, all of these devices require that the entire mechanism be stopped before a skewer holding the food can be removed. In a restaurant setting, a user may need to cook many different types of food simultaneously, it is burdensome to a user to stop an entire device in order to remove one or more skewers. The present invention allows a user to remove one, or more, skewers without having to stop the rotation of all the skewers over the heat source.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a device that is capable of slowly rotating several skewers. The skewers holding food are rotatably suspended over a heat source which cooks the food. One or more of these skewers can be retrieved and disengaged from the roasting mechanism without requiring that the entire mechanism be stopped.

It is another object of present invention to provide an apparatus where the skewers can be regularly engaged to a running mechanism that is slowly rotating several other skewers without requiring that the mechanism be stopped prior to the engagement, or later disengagement, of the skewer.

It is yet another object of this present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 illustrates an isometric broken view of the skewer assembly.

FIG. 4 is a cross-section view of FIG. 3, along line 4—4.

DETAILED DESCRIPTION OF THE PREFERRED EMBODIMENT

Figure 1:
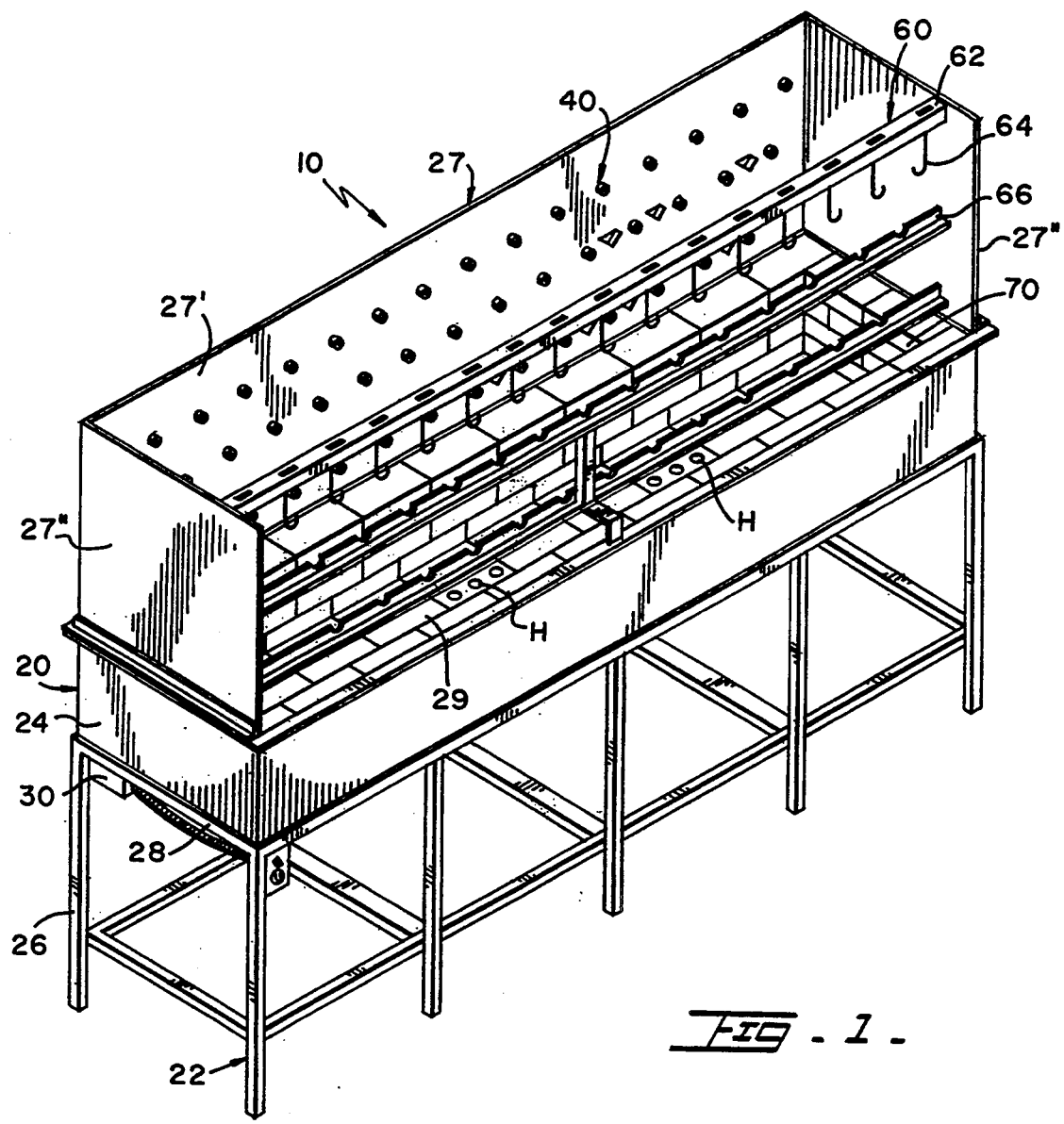
FIG. 1 represents an isometric view of the invention.

Referring now to the drawings, where the present invention is generally referred to with numeral 10, it can be observed that it basically includes support assembly 20, drive assembly 30, sprocket assembly 40, skewer assembly 50, upper support assembly 60 and heating space 70.

Referring now to FIG. 1, it can be seen that support assembly 20 includes stand 22, frieze 24, legs 26 and bottom 28. Frieze 24 and bottom 28 house a plurality of refractory members 29 and also cooperatively define heating space 70. Heating space 70 receives heating means H to heat and cook food stuffs suspended over heating space 70. Heating means H could be charcoal, an electric element, gas or other equivalent means. The heat from heating means H, contained in space 70, passes upward and cooks foodstuffs that are being rotated, by skewer assemblies 50 over space 70. Space 70 is lined with refractory material 29 which is designed to resist the high temperatures generated by heating means H.

Stand 22 has a plurality of legs 26 which elevate the food stuffs being cooked by device 10 to a position such that a user can comfortably operate it. Bottom 28 is rigidly mounted to the tops of legs 26. Frieze 24 is fixedly attached to the periphery of bottom 28, in the preferred embodiment.

Figure 2:
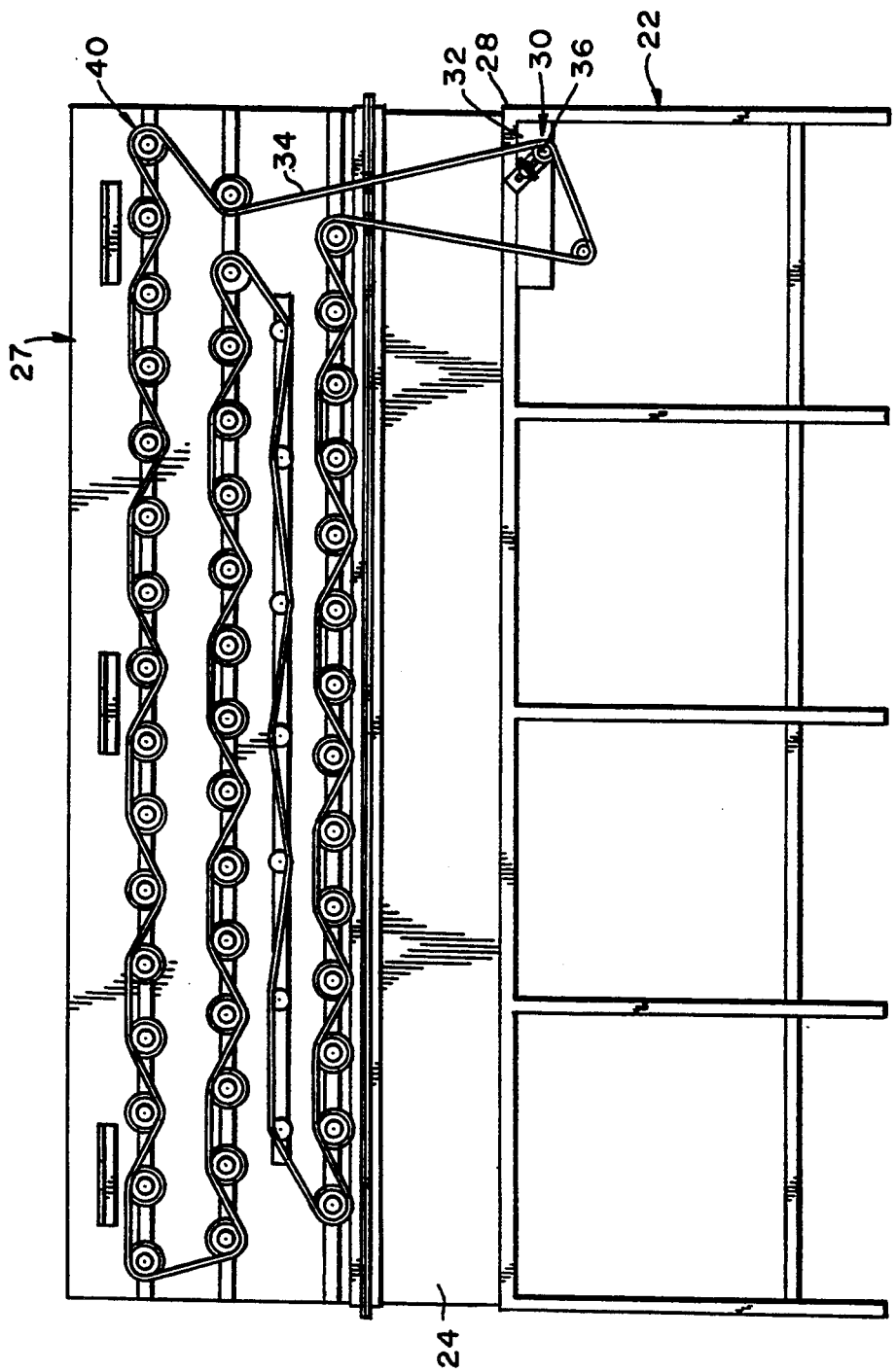
FIG. 2 shows a back elevational view.

Referring to FIGS. 1 and 2, it can be seen that motor 32 of motor drive assembly 30 is mounted to the underside of bottom 28. Housing 27 is rigidly mounted atop the back and sides of frieze 24. Housing 27 provides a means for reflecting heat and prevents grease from spattering outside device 10 and further includes rear wall 27' and two lateral walls 27". Lateral walls 27" are mounted perpendicularly to rear wall 27' and kept in a spaced apart and parallel relationship to each other by rear wall 27'. Rear wall 27' and lateral walls 27" cooperatively define a space above heating space 70. As best seen in FIG. 1, cross-bar 62 and crenulated cross-bar 66 are rigidly attached to, and suspended by, lateral walls 27" of housing 27.

As can best be seen in FIGS. 1, 2 and 3, a plurality of rotatable assemblies 40 are removably received by the rear wall 27', of housing 27, and extend transversely therethrough. Rotatable assemblies 40 include sprocket wheel 42, transverse shaft 44, receiving shank 46 and cross-hatched slot 48. Transverse shafts 44, which have first and second ends, of rotatable assemblies 40 are journaled by suitable apertures in the rear wall 27' of housing 27. The first end of transverse shaft 44 is rigidly mounted to sprocket wheel 42 and the second end is rigidly mounted to the first end of receiving shank 46. The second end of receiving shank 46 having a cross-hatched slot 48 thereon for receiving point 58 of skewer assembly 50. In this preferred embodiment, point 58 engages and disengages while receiving shank 46 is rotating without requiring that skewer assemblies 50 stop rotating or that drive assembly 30 be disengaged.

Referring now to FIG. 3, it can be seen that skewer assembly 50 includes shaft 52, grooved ring 54, handle 56, elongated channel 57 and point 58. Shaft 52 having first and second ends. The first end including point 58 which is slidably received by cross-hatched slot 48. The second end of shaft 52 being rigidly mounted to handle 56.

Referring now to FIG. 2, it can be seen that drive assembly 30 rotates the plurality of rotatable assemblies 40. Drive assembly 30 includes motor 32, linked chain 34 and spur gears 36. Linked chain 34 is trained over sprocket wheels 42 of rotatable assembly 40. When motor 32 is activated, gears 36 drive linked chain 34, thereby causing all rotating assemblies 40 to turn and thereby rotating skewer assemblies 50 and the food removably mounted thereon. The slow rotation of the articles of food over the heating means found in space 70 causes the food to be roasted.

Referring again to FIGS. 1 and 3, it can be observed that skewer assemblies 50 have first and second ends and that the second ends of skewer assemblies 50 are held in a laterally spaced apart relationship by upper support assembly 60. Upper support assembly 60 includes cross-bar 62, hooks 64 and crenulated cross-bar 66. Cross-bar 62 having hooks 64 suspended therefrom, hooks 64 removably receiving grooved ring 54 and thereby supporting the second end of skewer assembly 50. Similarly, crenulated cross-bar 66 removably receives grooved ring 54 of skewer assembly 50 and suspends skewer assembly 50 over heating means H contained in heating space 70. Upper support assembly 60 is rigidly mounted to the lateral walls 27" of housing 27. As discussed above, the first ends of skewer assemblies 50 are kept in a lateral space apart relationship by rotatable assemblies 40 and, when drive assembly 30 is engaged, rotated over the heat source H.

Referring now to FIGS. 3 and 4, it can be observed that skewer assembly 50 includes elongated channel 57. Elongated channel 57 runs substantially along the length of shaft 52 and provides a means for more securely holding a food stuff on skewer assembly 50.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A rotisserie apparatus for cooking articles of food and said apparatus including a heat source comprising:
   A. housing means mounted above said heat source including a rear wall, two lateral walls perpendicularly mounted to said rear wall and said lateral walls being kept in a spaced apart and parallel relationship to each other by said rear wall, said lateral walls and said rear walls defining a space therein;
   B. a plurality of rotatable means mounted to said rear wall and said rotatable means including a respective plurality of receiving shank members that protrude through said rear wall into said space, and wherein said receiving shanks include a cross-hatch thereon;
   C. a plurality of skewer means removably mounted to said receiving shank members so that said skewer means engage and disengage to said shank members while rotating, and wherein the skewer means includes a shaft, having first and second ends, a point on said first end and an elongated channel running longitudinally substantially along the length of said shaft and said point being received by said cross-hatch of said receiving shanks;
   D. means for supporting said plurality of skewer means when said skewer means are engaged to said receiving shank members so that said skewer means are kept in a spaced apart and a parallel relationship with respect to each other and to said heat source, and wherein said means for supporting said plurality of skewer means includes a cross-bar, having hooks suspended therefrom, and a crenulated cross-bar, said hooks and said crenulated cross-bar demountably engaging said skewer means and keeping said skewer means in a spaced apart and parallel relationship with respect to each other and to said heat source; and
   E. means for rotating said plurality of rotatable means.

* * * * *